United States Patent [19]

Parlor

[11] 4,414,435
[45] Nov. 8, 1983

[54] INTERFACE CIRCUIT WITH FLUX CANCELLING TRANSFORMER CIRCUIT

[75] Inventor: Bryan R. Parlor, Nepean, Canada

[73] Assignee: Northern Telecom Limited, Montreal, Canada

[21] Appl. No.: 370,986

[22] Filed: Apr. 22, 1982

[51] Int. Cl.³ ............................................. H04M 1/00
[52] U.S. Cl. .................................................. 179/81 R
[58] Field of Search ................ 179/16 F, 78 R, 78 A, 179/79, 80, 81 R, 99 LC, 170 D

[56] References Cited

U.S. PATENT DOCUMENTS

| | | | |
|---|---|---|---|
| 3,384,810 | 5/1968 | Kelsey. | |
| 3,723,662 | 3/1973 | Macrander | 179/16 F X |
| 3,959,718 | 5/1976 | Hasegawa. | |
| 4,046,967 | 9/1977 | O'Neill | 179/16 F X |
| 4,046,968 | 9/1977 | Embree et al. | 179/16 F X |
| 4,046,969 | 9/1977 | Dalley | 179/16 F X |
| 4,103,112 | 7/1978 | Korsky | 179/81 R X |
| 4,232,293 | 11/1980 | Harris | 179/81 R X |
| 4,243,842 | 1/1981 | Gibb | 179/16 F X |
| 4,369,337 | 1/1983 | Parlor | 179/81 R |

Primary Examiner—G. Z. Rubinson
Assistant Examiner—Keith E. George
Attorney, Agent, or Firm—F. P. Turpin

[57] ABSTRACT

A circuit for interfacing a subscriber loop to subscriber terminal apparatus is provided with a transformer having a split primary winding, a secondary winding and a balance winding. A constant current source is connected to the balance winding to cause a predetermined amount of current to flow therethrough. A current sink circuit is connected serially with the primary winding for regulating the direct current flowing therethrough to an amount proportional to that flowing through the balance winding whereby the DC flux generated by the current flowing through the primary winding substantially cancels the DC flux generated by the current flowing through the balance winding.

8 Claims, 1 Drawing Figure

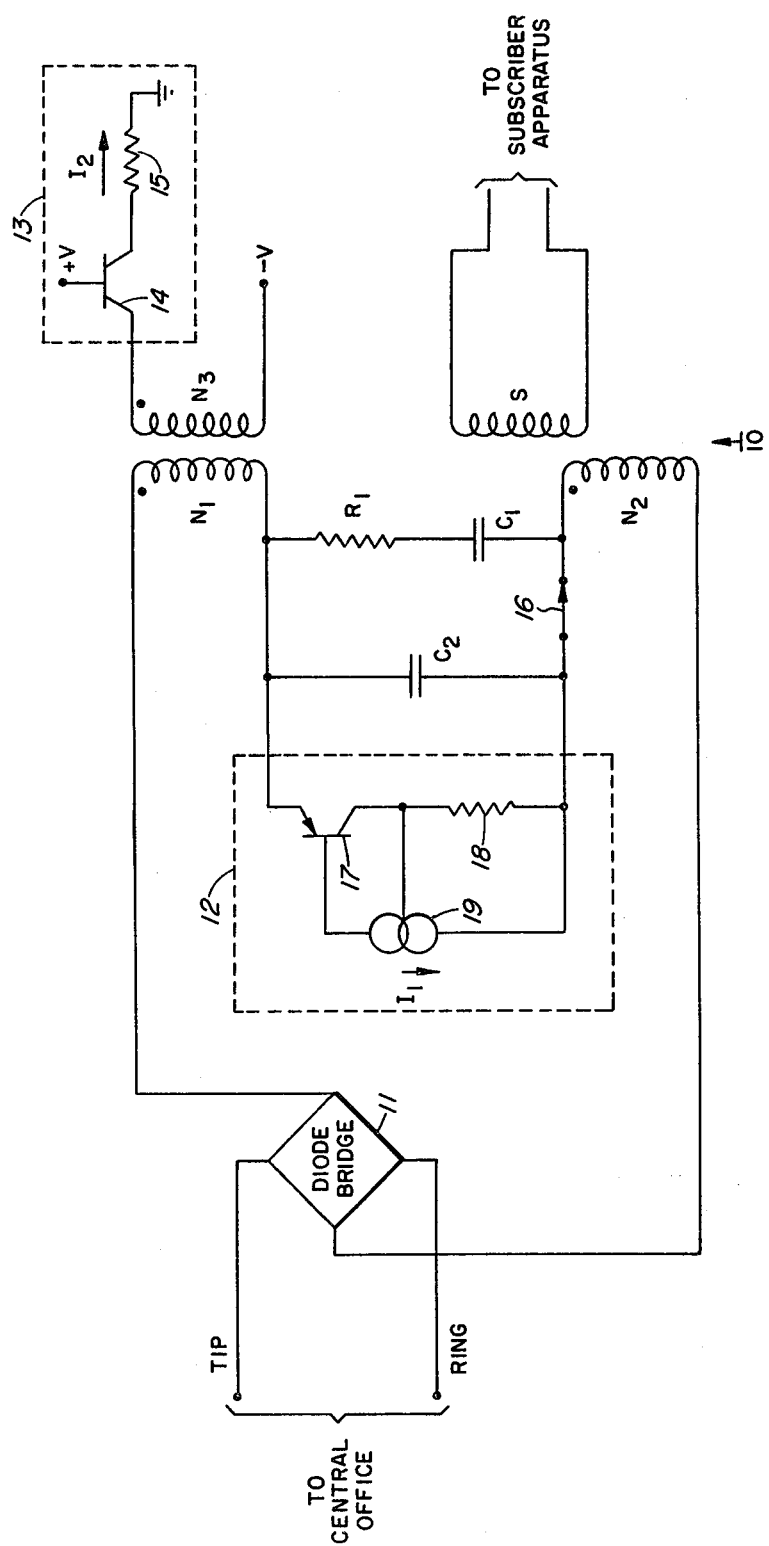

INTERFACE CIRCUIT WITH FLUX CANCELLING TRANSFORMER CIRCUIT

This invention relates to telephone apparatus generally and more particularly to a central office interface circuit for connecting subscriber apparatus to a subscriber loop.

BACKGROUND OF THE INVENTION

A central office interface circuit is usually located on the subscriber's premises and is used to connect the subscriber loop to one or more subscriber apparatus units. The central office interface is generally designed to appear electrically to the central office, as a typical telephone set. It is also designed to isolate the DC component of the signal from the AC component of the signal at the subscriber's end. Since such a circuit is located at the subscriber's end of the loop there is not a battery feed provided at the interface circuit. A typical central office interface circuit particularly adapted for use with electronic key telephone apparatus is described in U.S. Pat. application Ser. No. 146,237 filed May 5, 1980 issued as U.S. Pat. No. 4,369,337 and assigned to the instant assignee.

The isolation of the DC component on the subscriber loop from the subscriber apparatus is most conveniently achieved by using an isolation transformer. However, such a transformer has to carry substantial current of up to approximately 120 milliamps on a short subscriber loop to the central office. In order to prevent saturation, the transformer has to be provided with a relatively expensive and fairly bulky laminated core with an air-gap. In addition, since such a core generates significant fringing magnetic fields, the transformer must be shielded.

The solution to the problem of course lies in the provision of a circuit wherein the DC flux of the transformer is balanced to approximately a zero value. Flux balancing or cancellation is generally well known in the art for example as disclosed in U.S. Pat. No. 3,384,810, issued May 21, 1968 to E. S. Kelsey and assigned to the assignee of the instant invention. Other flux cancellation circuits are described in U.S. Pat. No. 3,959,718 and U.S. Pat. No. 4,103,112. These patents describe various serial and parallel transformer configurations which provide balance windings to substantially cancel the DC flux generated in the primary windings of the transformer in combination with means for connecting a source of power or battery feed to the subscriber loop. Basically, all the known prior art circuits operate by varying the DC current through the balance winding(s) to compensate for the DC flux generated by the current flowing through the primary winding.

THE INVENTION

In accordance with the invention, there is provided a flux cancellation circuit for use in a central office interface circuit. The isolation transformer is provided with a balance winding connected to a constant current source supplying it with a predetermined amount of current. A current sink circuit is connected serially with the split primary winding of the transformer to sink the current flowing therethrough to an amount proportional to that flowing through the balance winding, whereby the DC flux generated by the current flowing through the primary winding substantially cancels the DC flux generated by the current flowing through the balance winding.

Whereas, in the prior art, the flux cancellation current is varied proportionally to the current causing the flux, the flux cancellation current in this circuit is held substantially constant. In other words, the current causing the necessity for flux cancellation is regulated to a predetermined level by a current sink circuit and the flux cancellation current is maintained at a predetermined level by a constant current source. This results in a relatively simple and economical circuit.

An example embodiment of the invention will now be described in conjunction with the drawing which is a circuit diagram of a central office interface circuit having a flux cancelling transformer arrangement in accordance with the invention. So as not to detract from the invention, only that portion of the interface circuit necessary to the understanding of the invention is illustrated.

The diagram shows a transformer generally at 10 having a secondary winding S for connection to subscriber apparatus as for example an electronic key telephone unit, and a split primary winding $N_1$, $N_2$ for connection to the tip and ring leads of the subscriber loop to the central office via a conventional diode bridge 11. The primary winding $N_1$, $N_2$ is also connected serially to a current sink circuit 12. It should be realized that the diode bridge may encompass other voltage control circuitry which is not described herein since such circuitry is not relevant to the invention.

The transformer 10 is also shown as having a balance winding $N_3$ connected to a source of power and to a constant current source 13 which may, for example, comprise a series-connected transistor 14 and resistor 15. The windings of the transformer 10 are poled as indicated with the conventional symbol.

Also connected serially with the split primary windings $N_1$, $N_2$ of the transformer 10 is a network $R_1C_1$ which functions to quench the effect of a switch 16 as for example during dialling. The switch 16 may be a relay or an electronic switch controlled by the subscriber apparatus. A capacitor $C_2$ is connected across the current sink circuit 12 to reduce the AC impedance thereof.

The current sink circuit 12 comprises a transistor 17, resistor 18 and an adjustable current device 19 which may conveniently be an off-the-shelf component, for example, component number LM334 available from National Semiconductor.

The current flowing through the primary winding $N_1$, $N_2$ flows through transistor 17 and resistor 18 which generates the control voltage for the device 19 which in turn controls the base current of transistor 17. Therefore, the current through the primary winding $N_1$, $N_2$ and the subscriber loop is regulated to a predetermined level. This current should be adjusted to be within the normal operating range for a subscriber loop. Ideally, the current level should be adjusted to be at least slightly larger than the current flowing in the longest permissible subscriber loop (e.g. about 30 milliamps).

In operation, the line circuit power source at the central office causes current to flow through the tip and ring leads which in turn causes a DC current $I_1$ to flow through the primary winding $N_1$, $N_2$ and the current sink circuit 12 which regulates that current to a predetermined value. The constant current source 13 causes a predetermined current $I_2$ to flow through the balance winding $N_3$. If the current through the primary winding $N_1$, $N_2$ is regulated such that $I_1(N_1+N_2)=I_2N_3$, then effective flux cancellation takes place and is maintained at that level due to the current regulation function of the current sink circuit 12.

What is claimed is:

1. A circuit for interfacing a subscriber loop to subscriber terminal apparatus, comprising, a transformer having a split primary winding for connection to said loop, a secondary winding for connection to said apparatus and a balance winding having a polarization opposite to that of the primary winding, a constant current source connected to the balance winding for causing a predetermined amount of current to flow therethrough, a current sink circuit connected serially with the split primary winding for regulating the direct current flowing therethrough to an amount proportional to said predetermined amount of current whereby the DC flux generated thereby substantially cancels the DC flux generated by the current flowing through the balance winding.

2. A circuit as defined in claim 1 wherein the current sink circuit comprises a transistor connected serially with a resistor, and an adjustable current sink device having a first terminal connected to the base termnal of the transistor, a second terminal connected to the junction of the resistor and one portion of the primary winding and its control terminal connected to the junction of the transistor and resistor series circuit.

3. A circuit as defined in claim 2 and further comprising a capacitor connected in parallel with the current sink circuit for providing a low impedance path for alternating current signals.

4. A circuit for interfacing a subscriber loop to subscriber terminal apparatus comprising, a transformer having a split primary winding ($N_1$, $N_2$) for connection to said loop, a secondary winding for connection to said apparatus, and a balance winding ($N_3$), a constant current source connected to the balance winding for causing a predetermined amount of DC current ($I_2$) to flow therethrough, circuit means connected serially with the primary winding for regulating the DC current flowing therethrough to an amount ($I_1$) so that $I_1(N_1+N_2)=I_2N_3$, whereby the DC flux generated by the current through the balance winding substantially cancels the DC flux generated by the current through the primary winding.

5. A circuit as defined in claim 4 wherein the circuit means comprises a current sink circuit connected between the two halves of the primary winding.

6. A circuit as defined in claim 5 wherein the current sink circuit comprises a transistor having emitter, base, and collector terminals, and a resistor, the emitter being connected to one end of one half of the primary winding and the collector being connected to an adjacent end of the other half of the primary winding via the resistor, and a current sink device having one input connected to the base terminal of the transistor, a second terminal connected to said adjacent end of the other half of the primary winding, and its control input connected to the collector terminal of the transistor.

7. A circuit as defined in claim 6 and further comprising a capacitor connected in parallel with the current sink circuit for providing a low impedance path for alternating current signals at voice frequencies 8. In a circuit for interfacing a subscriber loop to subscriber apparatus, the interface circuit comprising a transformer having a split primary winding connected to the subscriber loop, a secondary winding connected to the subscriber apparatus and a balance winding, a method of cancelling the effect of the DC flux generated by the direct current flowing through the primary winding, comprising the steps of:

applying a predetermined constant current to the balance winding thereby to generate a predetermined level of DC flux;

current sinking the DC current flowing through the primary winding to an amount proportional to said constant current;

whereby the DC flux generated by the current flowing through the primary winding substantially cancels the DC flux generated by the current flowing through the balance winding.

* * * * *